(12) United States Patent
Akimoto

(10) Patent No.: US 6,536,266 B1
(45) Date of Patent: Mar. 25, 2003

(54) PISTON BEHAVIOR ANALYZING SENSOR MOUNTING STRUCTURE AND PISTON BEHAVIOR ANALYZING METHOD

(75) Inventor: Yoshiaki Akimoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,202

(22) Filed: May 19, 2000

(30) Foreign Application Priority Data

May 19, 1999 (JP) .......................................... 11-138622
May 19, 1999 (JP) .......................................... 11-138623

(51) Int. Cl.[7] ................................................. G01L 3/20
(52) U.S. Cl. ....................................................... 73/116
(58) Field of Search ............................. 73/116, 119 R, 73/119 A; 123/73 A, 41.15, 193.6

(56) References Cited

U.S. PATENT DOCUMENTS 5,782,217 A * 7/1998 Ito et al. .................... 123/193.6
5,814,724 A * 9/1998 Romkee .................... 73/119 R
6,083,064 A * 7/2000 Watanabe et al. ........ 123/41.15

FOREIGN PATENT DOCUMENTS

JP 4-140430 * 5/1992 ........... F02B/77/08

* cited by examiner

*Primary Examiner*—Eric S. McCall
*Assistant Examiner*—Maurice Stevens
(74) *Attorney, Agent, or Firm*—Sughrue Mion, PLLC

(57) ABSTRACT

Pairs of sensors are disposed vertically, each pair of sensors being disposed such that they hold a piston laterally, and those pistons are provided in such a manner as to extend across a water jacket provided so as to surround a cylinder liner defining a cylinder chamber receiving therein the piston. Since sensor accommodating cases extend across the water jacket, the accommodating case can preferably be cooled by cooling water, and the sensors can in turn be cooled via the accommodating cases, whereby the effect of heat from combustion chambers on the sensors can be reduced, thereby making it possible to improve the detection accuracy of the sensors.

22 Claims, 8 Drawing Sheets

PISTON BEHAVIOR ANALYZING SENSOR MOUNTING STRUCTURE AND PISTON BEHAVIOR ANALYZING METHOD

BACKGROUND OF THE INVENTION

1. Field of the Invention

The present invention relates to a piston behavior. analyzing sensor mounting structure suitable for mounting on a cylinder block sensors for measuring a gap between a piston and an associated cylinder liner to analyze the behavior of a piston while the engine is running.

The present invention also relates to a piston behavior analyzing method for analyzing the behavior of a piston through variation in gap between the piston and an associated cylinder liner with reference to the crank angle.

2. Description of the Related Art

It is important to analyze various data while the engine is running in order to improve the quality of the engine. For instance, in a case where the cause of abnormal noise is considered to be the striking noise of a piston, the behaviors of pistons may be analyzed. In analyzing the behaviors of the pistons, since the pistons adapted to reciprocate within associated cylinder liners have required gaps relative to the inner circumferential surfaces of the cylinder liners, the pistons are free to move radially within the cylinder liners, whereby the movements thereof can be detected as variation in gap between the pistons and the associated cylinder liners, thereby making it possible to perform the aforesaid analysis of the piston behaviors from the result of the detection.

On the other hand, in order to detect the overheat of pistons while an engine is running, for example, Japanese Patent Unexamined Publication No. Hei. 4-140430 discloses a structure in which gap sensors are provided on a cylinder bock of the engine to detect gaps between the pistons and associated cylinder liners. The behaviors of the pistons can also be analyzed using gap values detected by the gap sensors so provided.

In the Japanese Patent Unexamined Publication No. Hei. 4-140430, the gap sensors are provided on a piston bottom dead center side of the cylinder liners, and the gap detection at the bottom dead centers of the pistons provide a problem that accurately grasping the behaviors of the pistons is insufficient.

To cope with this, it is necessary to detect gaps on a piston top dead center side of the liners where the behaviors of the pistons tend to be unstable. In a case where gap sensors are provided on the top dead center side, however, the sensors are largely affected by heat from combustion chambers, this causing various problems. For example, in a case where the sealing properties between the sensor mounting portion and the piston (oil rings) is deteriorated, lubricating oil starts to leak from there, causing a problem that the consumption of oil is increased. In addition, with the Japanese Patent Unexamined Publication No. Hei. 4-140430, there is another problem that gaps in axial directions of a crankshaft cannot be detected.

In addition, gap values detected by the gap sensors are largely affected by the mounting conditions of the gap sensors, causing a problem that the inaccurate mounting of gap sensors results in a deterioration in detection accuracy. In addition, while the engine is running, the effect of heat on the gap sensor mounting positions varies as the engine speed or load varies. In a case where a gap sensor accommodating case is made of stainless steel, while the cylinder block is made of aluminum, for example, there is caused a certain distortion between the accommodating case and the engine by virtue of the difference in the amount of deformation by the thermal expansion caused by heat, and this causes in turn a problem that the mounting positions of the gap sensors relative to the cylinder liners are shifted several $\mu$m relative to those set when the gap sensors were mounted. In addition, when the engine speed is fast, there is a risk of a deterioration in gap detection accuracy being caused at the top dead center of the piston by virtue of the difference in response frequency between the gap sensors and crank angle sensors.

SUMMARY OF THE INVENTION

An object of the present invention is to solve the above problems inherent in the prior art.

In particular, an object of a first aspect of the invention is to realize a piston behavior analyzing sensor mounting structure for detecting the behaviors of pistons at top dead center positions thereof without any problem.

According to the first aspect of the invention, the object thereof is achieved by a piston behavior analyzing sensor mounting structure for mounting on a cylinder block (6) sensors (7a, 7b, 8a, 8b) for detecting gaps between pistons (4a, 4c) and associated cylinder liners (3a, 3c) on at least top dead center sides of the pistons (4a, 4c) for analysis of the behaviors of the pistons (7a, 7b, 8a, 8b) while an engine (1) is running, wherein accommodating cases (11) for the sensors (7a, 7b, 8a, 8b) are provided so as to pass through a water jacket (10) surrounding the cylinder liners (3a, 3c).

According to this structure, the accommodating cases can preferably be cooled by the cooling water and the sensors can in turn be cooled via the accommodating cases so cooled, whereby the effect of heat from the combustion chambers can be reduced.

In particular, the accommodating cases (11) are fixed on the cylinder liner sides, and portions of the accommodating cases (11) located more outwardly of the water jacket (10) may be sealed with a sealing member (16) in a state in which a thermal deformation of the accommodating cases (11) is possible relative to the cylinder block (6). According to this construction, even if the cylinder block is deformed by virtue of heat from the combustion chambers, the accommodating cases can securely be sealed.

In addition, portions of the sensors (7a, 7b, 8a, 8c) facing the interiors of the cylinder liners (3a, 3c) are constructed so as to be covered with lids (15) of a heat resistant resin. According to this construction, the sensors can be protected against heat from the combustion chambers. In addition, since the lids are made from the resin, not only is there no risk of the piston being damaged but also easy machining is possible, whereby cylinder bores can be machined after the lids are installed and good sealing properties can also be provided.

Furthermore, the sensors (7a, 7b) are constructed so as to be disposed in such a manner as to extend from a side of the cylinder block (6) in an axial direction of a crankshaft (5) toward the interior of the cylinder liner (3a). According to this construction, since it is possible to detect a relatively large deformation of a top land of the piston in the axial direction of the crankshaft, the accuracy with which the behavior of the piston is detected can be improved.

In addition, the sensors (7a, 7b) are constructed so as to be disposed in such a manner as to extend from a side of the cylinder block (6) which avoids a direction normal to the axis of the crankshaft (5) toward the interior of the cylinder liner (3a) and in an end face (6f) of the cylinder block (6) which is farthest away in an axial direction of the crankshaft (5) from a portion where a thrust control portion (17) for the crankshaft (5) is provided.

According to this construction, the position of the top land of the piston which is located at the position away from the thrust control portion and is liable to vary largely in a thrust direction can preferably be detected with high accuracy, and the mounting structure of the sensors is prevented from getting complicated, the cylinder block being thus prevented from getting large in size. In addition, the sensors only have to be disposed on the side which avoids the direction normal to the axis of the crankshaft, in other words, at an angle of substantially 180 degrees or less than 180 degrees relative to the crankshaft axis. This disposition of the sensors makes it possible to detect the behavior of the piston in the axial direction of the crankshaft.

Furthermore, the first sensors (7a, 7b) are disposed so as to extend from a side of the cylinder block (6) in an axial direction of a crankshaft (5) toward the interior of the cylinder liner (3a), and the second sensors (8a, 8b) are disposed so as to extend from a side of the cylinder block (6) which is normal to the axis of the crankshaft (5) toward the interior of the cylinder liner (3c). According to this construction, since the displacements of the pistons in the axial direction of the crankshaft and the direction normal to the axial direction of the crankshaft, respectively, can be detected, the behaviors of the pistons can be grasped with accuracy.

Moreover, there is provided a piston behavior analyzing sensor mounting structure for mounting on a cylinder block (6) sensors (7a, 7b) for detecting gaps between a piston (4a) and an associated cylinder liner (3a) on at least a top dead center side of the piston (4a) for analysis of the behavior of the piston (4a) while a multi-cylinder engine is running, wherein an introduction port (6w) is formed in the cylinder block (6) for introducing cooling water discharged from a water pump (18), and wherein the sensors (7a, 7b) are disposed so as to extend toward the interior of a cylinder liner (3a) which is closest to the cooling water introduction port (6w).

According to this construction, since the sensors are disposed at the position having the highest cooling efficiency, the effect of heat from the combustion chamber on the sensors can be reduced as much as possible.

In addition, an object of a second aspect of the invention is to prevent as much as possible the generation of detection errors that would be caused by various external factors in sensors for detecting a gap between a piston and an associated cylinder liner while an engine is running. According to the second aspect of the invention, the object is achieved by a piston behavior analyzing method for analyzing the behavior of a piston (4c) through change in gap between said piston (4c) and an associated cylinder liner (3c) in response to the angle of an associated crank while an engine is running, comprising the steps of detecting a gap between the piston (4c) and the associated cylinder liner (3c) with a sensor (8a) provided in the cylinder liner (3c), obtaining a variation ($\Delta V$) between a reference value corresponding to an abutment state between the piston (4c) and the cylinder liner (3c) and a minimum value (V min) in operation constituted by a minimum value among gap values (V) detected while the engine is running, and correcting the gap values (V) detected while the engine is running by an amount equal to the variation ($\Delta V$) for an actual gap value.

According to this construction, the gap sensors mounting portion is subjected to the effect of heat generated when the engine speed or load varies, and even if the mounting positions of the gap sensors in the cylinder liner are shifted relative to those set when they were mounted in the cylinder liner, an error can be eliminated from the gap values detected while the engine is running by performing a zero correction with the gap minimum value while the engine is running being regarded as a zero position where the piston comes into abutment with the cylinder liner.

In particular, the minimum value among the gap values (V) detected while the engine is running is taken over a plurality of numbers of cycles, and wherein the minimum value (V min) in operation is calculated based on a plurality of the minimum values so taken. According to this, since a plurality of minimum values are taken which constitute a reference in performing the zero correction, the minimum value in operation can be calculated with high accuracy for performing the zero correction by calculating an average value from those minimum values so taken.

In addition, there is provided a piston behavior analyzing method for analyzing the behavior of a piston through change in gap between the piston and an associated cylinder (3c) liner in response to the angle of an associated crank while an engine is running, comprising the steps of detecting positions (E, F) before and after a top dead center of the piston (4c) where piston rings of the piston pass with the sensor (8a) provided in the cylinder liner (3c) for detection of the gap, and making an intermediate point between two points of the positions (E, F) where the piston rings pass the position of a top dead center when analyzing the behavior of the piston.

According to this construction, since the piston position is directly seen with the sensor for detecting the gap between the piston and its associated cylinder liner, the top dead center can be detected with accuracy by detecting the piston positions before and after the top dead center thereof, and therefore, even if there is generated a difference in response frequency when the engine speed is fast between a crank angle detected by the crank angle sensor separately provided and the top dead center so detected, a correction can be performed therefor.

DETAILED DESCRIPTION OF THE PREFERRED EMBODIMENT

An embodiment of the invention will be described in detail below based on a specific example shown in the accompanying drawings.

Figure 1:
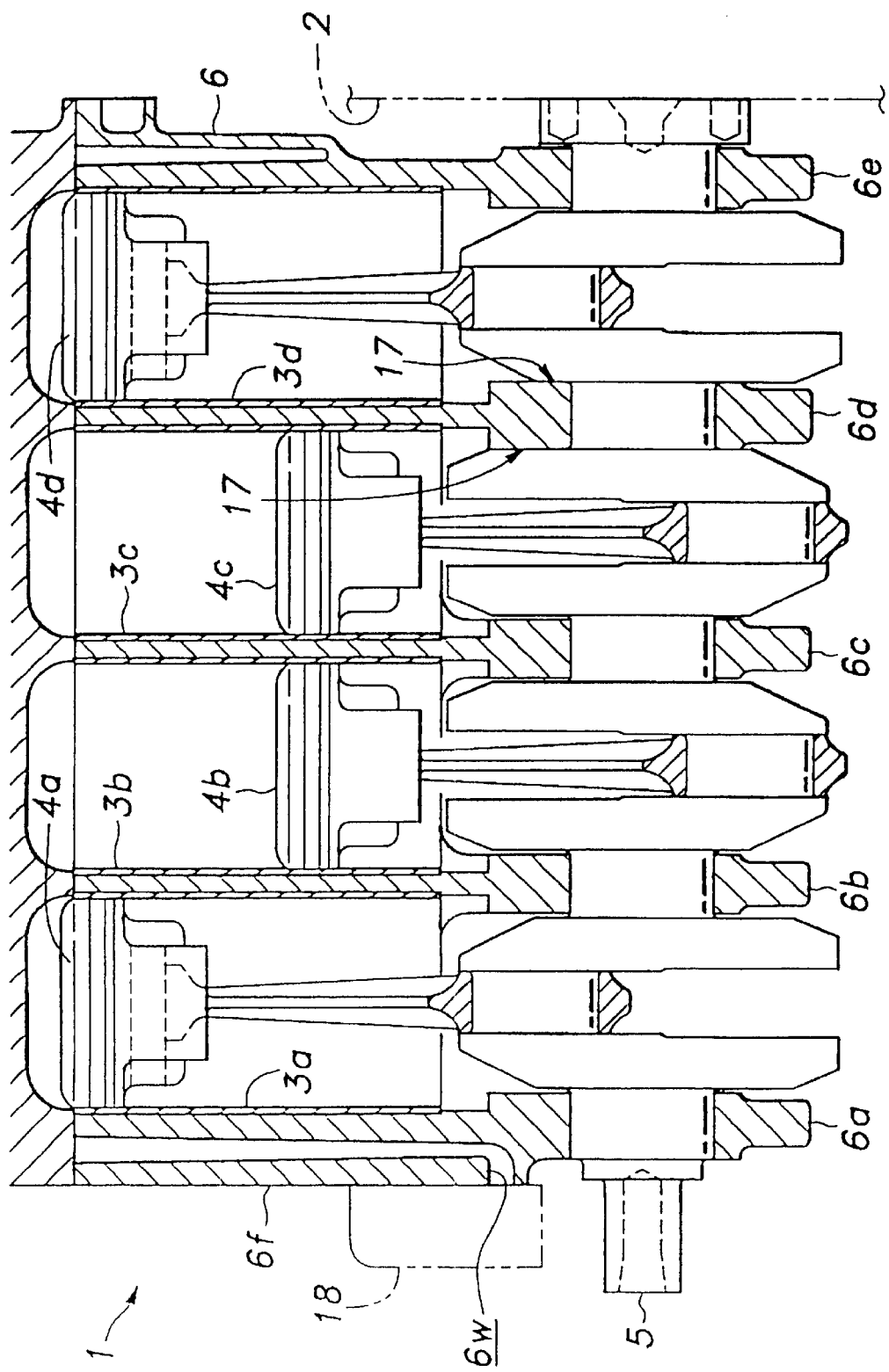
FIG. 1 is a side sectional view of a main part of an engine to which the present invention is applied.

FIG. 1 is a side sectional view of a main part of an engine to which the prevent invention is applied. While an in-line four cylinder engine is shown, the present invention can be applied to various types of engines.

In FIG. 1, cylinder liners 3a, 3b, 3c, 3d are provided in respective cylinders of the engine from a cylinder number located on a side where a timing belt (not shown) is mounted to a cylinder number 4 located on a side where a flywheel 2 is mounted, and pistons 4a, 4b, 4c, 4d are received in the respective cylinder liners 3a to 3d in such a manner that they freely reciprocate therein. In addition, a crankshaft 5 connecting to the respective pistons 4a to 4d via connecting rods is rotatably supported on respective journal bearings provided on respective journal walls 6a, 6b, 6c, 6d formed integrally with the cylinder block 6.

The engine 1 illustrated in FIG. 1 maybe a 4-cycle engine, and when fuel in combustion chambers in the respective cylinders is burned at predetermined timings, the respective pistons 4a to 4d reciprocate along four strokes such as power, exhaust, intake and compression strokes. Then, the crankshaft 5 rotates and a driving force is outputted from the flywheel 2 side to a transmission (not shown).

Figure 2:
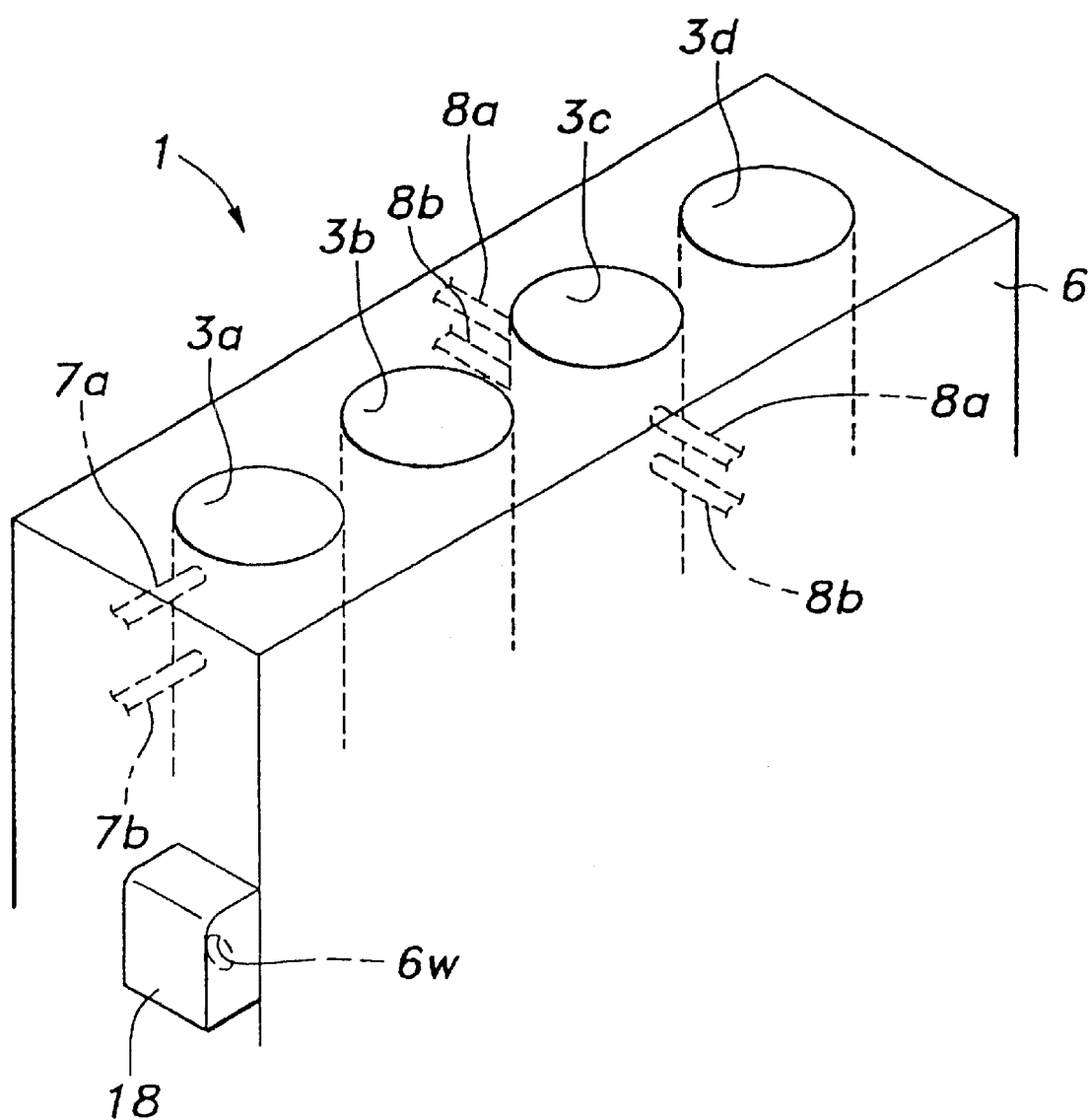
FIG. 2 is a typical perspective view showing a state in which respective sensors are disposed.

The behaviors of pistons in the engine 1 constructed as described above can be analyzed from measured values of gaps between the top lands of the pistons and associated cylinder liners and the skirts of the pistons and the associated cylinder liners. For example, as shown in FIG. 2, sensors 7a, 7b are provided as first sensors in the cylinder No. 1 in such a manner as to face the inner circumferential surface of an associated cylinder liner 3a and to be disposed vertically at a predetermined interval, while sensors 8a, 8b are provided as second sensors in the cylinder No. 3 in such a manner as to be symmetrical as viewed in a direction of a line of cylinders and to be disposed vertically at a predetermined interval.

Figure 3:
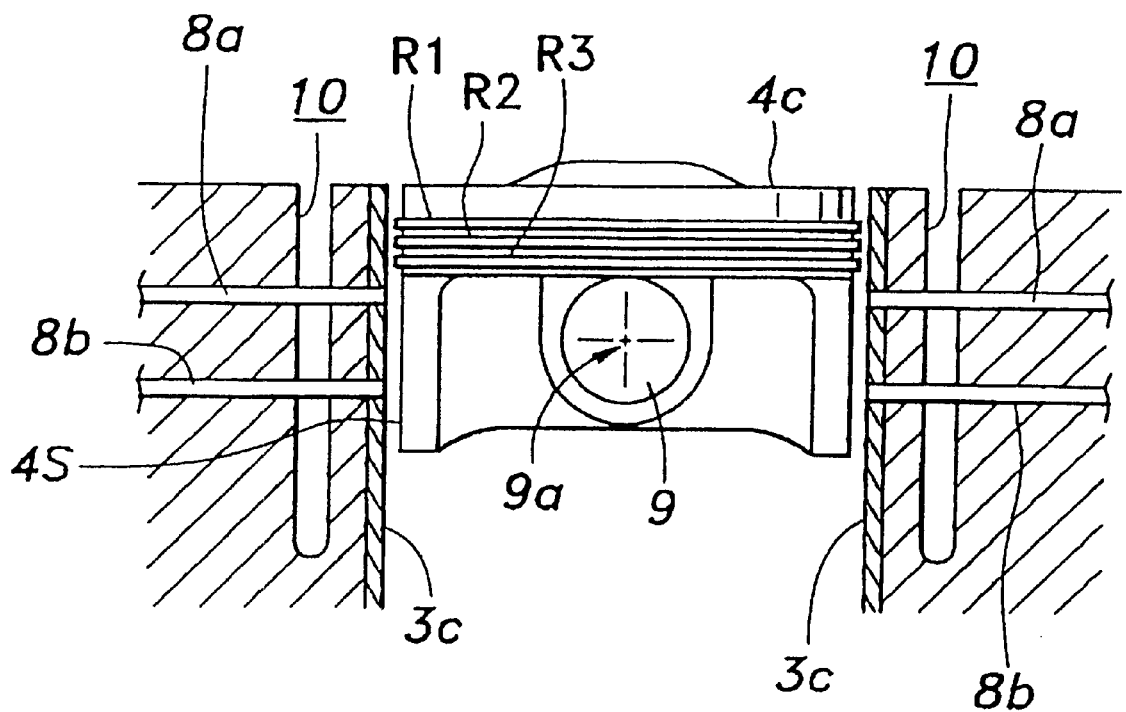
FIG. 3 is a sectional view of a main part of a number 3 cylinder showing a state in which sensors are disposed.

Of the first sensors, the sensor 7a positioned higher measures a gap between the piston top land 4T and the cylinder liner 3a at the position of a top dead center of the piston (refer to FIG. 5), and the second sensors 8a, 8b measure a gap between the piston skirt 4S and the cylinder liner 3c at the position of a top dead center of the piston (refer to FIG. 3). In addition, since the second sensors 8a, 8b are disposed such that an axial center 9a of the piston 9 is positioned between the upper side sensor 8a and the lower side sensor 8b of the second sensors when the piston reaches its top dead center, the accuracy with which the behavior of the piston skirt 4S is detected is improved. The respective sensors 7a, 7b, 8a 8b may be for example an eddy current gap sensor.

As shown in FIG. 3, the respective sensors 8a, 8b provided in the cylinder No. 3 are located at positions normal to the axis of the piston (a line parallel with the axis of the crankshaft 5), respectively. This allows the detection of displacements of the piston 4 in thrust and counter-thrust direction that are caused by virtue of an oscillation about the axis of a piston pin 9 in a preferable fashion. In addition, the respective sensors 8a, 8b are provided in such a manner to extend across a water jacket 10 provided so as to surround from the outside the cylinder liner 3c defining a cylinder chamber for receiving therein the piston 4c. Furthermore, similarly, the respective sensors 7a, 7b are also provided in such a manner as to extend across the water jacket 10. As shown in FIG. 3, provided in the piston 4c from its top land 4T side are three rings such as a top ring R1, a second ring R2 and an oil ring R3.

Figure 4:
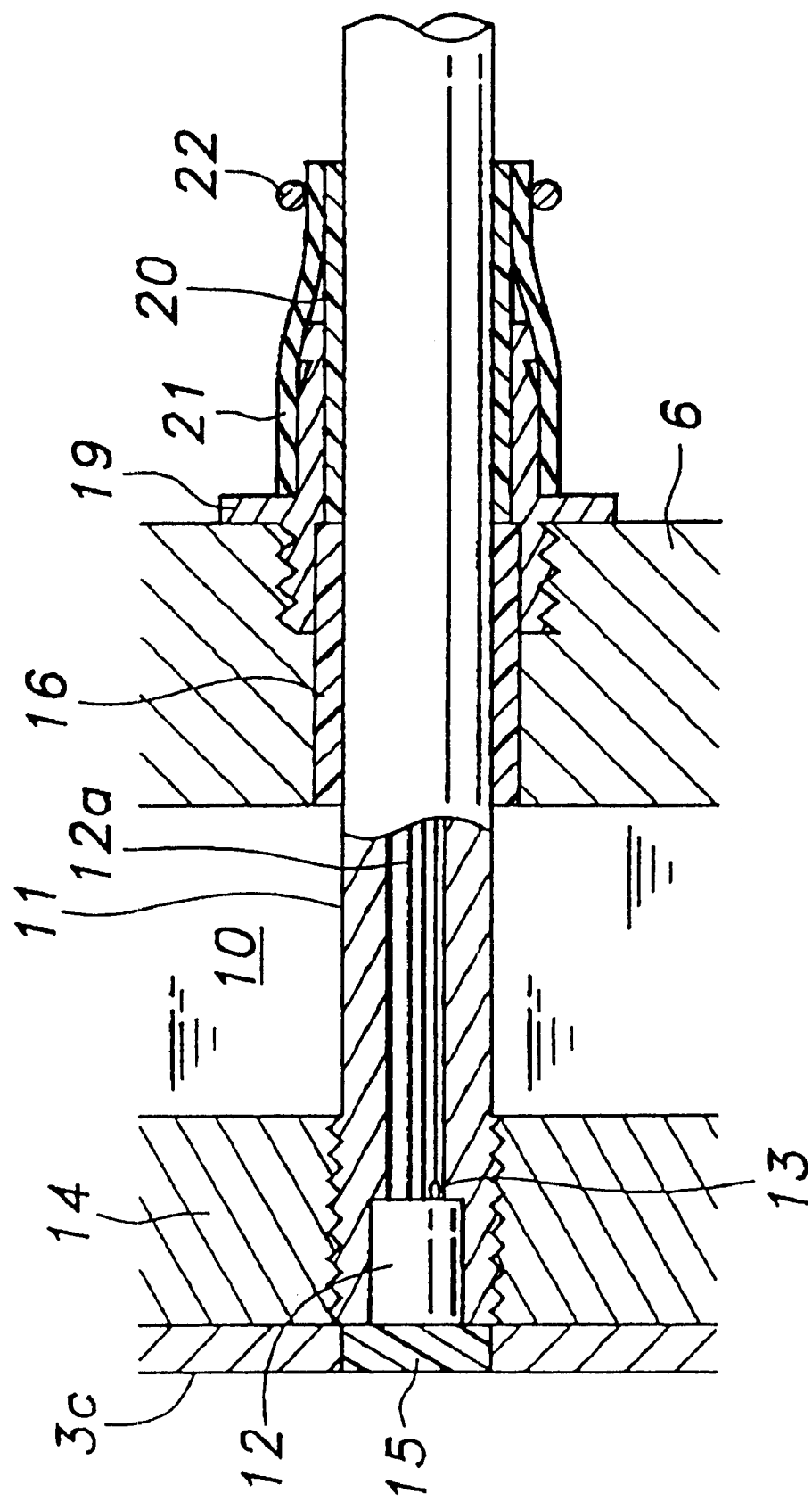
FIG. 4 is a side sectional view showing a main part of the sensor which is enlarged.

FIG. 4 shows an enlarged main part of the sensor 8a as representative of the sensors. As shown in FIG. 4, the sensor 8a has a metallic tube-like accommodating case 11 and a core 12 provided at a portion of the accommodating case 11 facing the interior of its associated cylinder. A signal line 12a extending from the core 12 and lead wires of a temperature compensating thermocouple 13 are accommodated in the accommodating case 11 and are connected to measuring equipment, not shown, which is located outwardly of the engine. In addition, threads are formed in the outer circumferential surface of a portion of the accommodating case 11 located on the cylinder liner 3c side so that the accommodating case 11 may be fixed to a sleeve 14 surrounding the cylinder liner 3c through screw connection.

Thus, since the accommodating case 11 is provided in such a manner as to extend across the water jacket 10, the accommodating case 11 is cooled by cooling water, and since the sensor 8a is cooled in turn via the accommodating case 11, there is no need to separately provide a cooling structure for the sensor 8a. In addition, the accommodating case 11 is desirably formed of a material such as brass having good heat dissipating properties and it is also desirably formed of a material such as stainless steel having strong corrosive properties.

Then, a heat resistant resin made lid 15 is provided so as to cover end faces of the core 12 and the accommodating case 11 on the cylinder line 3c side. Thus, the core 12 is prevented from directly contacting combustion gas in the cylinder chamber and is protected by the lid 15 against combustion heat. In addition, although the lid 15 is exposed on the inner circumferential surface of the cylinder liner 3c, as described above, since the lid 15 is formed of resin, after it has been installed, the lid 15 can be machined at the same time as the cylinder bore is machined and the lid 15 is also easily machined, whereby there is no risk of the piston being damaged thereby. In addition, in a case where the respective sensors 7a, 7b, 8a, 8b are eddy current gap sensors, since the lid 15 is made of resin, there is little effect of the lid 15 on the magnetic properties of the sensors, whereby the detecting accuracy can be improved.

Moreover, the accommodating case 11 extends through the water jacket 10 and passes through an outer wall portion of the cylinder block 6. When the cylinder block 6 is thermally expanded, there is caused a relative deviation in the pass-through direction at the portion where the accommodating case 11 passes through the outer wall portion. In order to get free from the deviation via a slippage between the outer wall portion and the accommodating case 11, a seal member 16 made from a low friction material is provided between the accommodating case 11 and the outer wall portion of the cylinder block 6 in such a manner as to surround the accommodating case 11.

In addition, in mounting on the outer wall portion of the cylinder block 6 the accommodating case 11 extending outwardly through the outer wall portion of the cylinder block 6, the mounting is effected by allowing the accommodating case 11 to extend through an axial hole in a telescopic tubular member 19 which is screw connected the outer wall portion. A tubular seal member 20 is interposed between the two members, and a rubber tube 21 is elastically fitted over a telescopically outwardly projecting portion of the telescopic tubular member 19 and the tubular rubber seal member 20. Then, an end of the rubber tube 21 is fastened together with the tubular rubber seal member 20 disposed inwardly thereof to the accommodating case 11 with a band 22.

By constructing as described above, a leakage of cooling water from between the accommodating case 11 for the sensor 8a provided in such a manner as to pass through the water jacket 10 and the outer wall portion of the cylinder block 6 can be prevented. Liquid packing may be applied instead of the seal member 16, and a seal tape may be wound around instead of the tubular seal member 20.

The respective sensors 8a, 8b provided in the cylinder No. 3 are located at such positions that allows the detection of a displacement of the piston at an intermediate portion of the piston stroke, while the sensors 7a, 7b in the cylinder No. 1 are disposed at such positions that allows the detection of a displacement of the piston 4a at its top dead center. In addition, those sensors 7a, 7b are located axially of the crankshaft 5, thereby making it possible to detect a movement of the piston 4a in the axial direction of the crankshaft 5. In the figure, the sensors 7a, 7b are disposed in the axial direction of the crankshaft 5 so as to face the interior of the cylinder liner 3a. In disposing the sensors for detection of the movement of the piston in the axial direction of the crankshaft 5, the sensors may be disposed on the side avoiding the direction normal to the axis of the crankshaft 5, in other words, at the angle of substantially 180 degrees or less than 180 degrees, and this disposition of the sensors allows the detection of the behavior of the piston in the axial direction of the crankshaft.

Furthermore, in the engine according to the invention, as shown in FIG. 1, a thrust control portion 17 for the crankshaft 5 is provided in a journal wall 6d between the cylinders No. 3 and NO. 4. Therefore, the aforesaid thrust behavior of the piston 4a becomes largest at the cylinder No. 1 which is farthest away from the control portion 17, and moreover, the behavior in the vicinity of the top dead center position of the piston 4a becomes largest. Thus, the displacement amount of the piston resulting from the thrust behavior thereof can preferably be detected by disposing the sensors 7a, 7b in the way described above.

Figure 5:
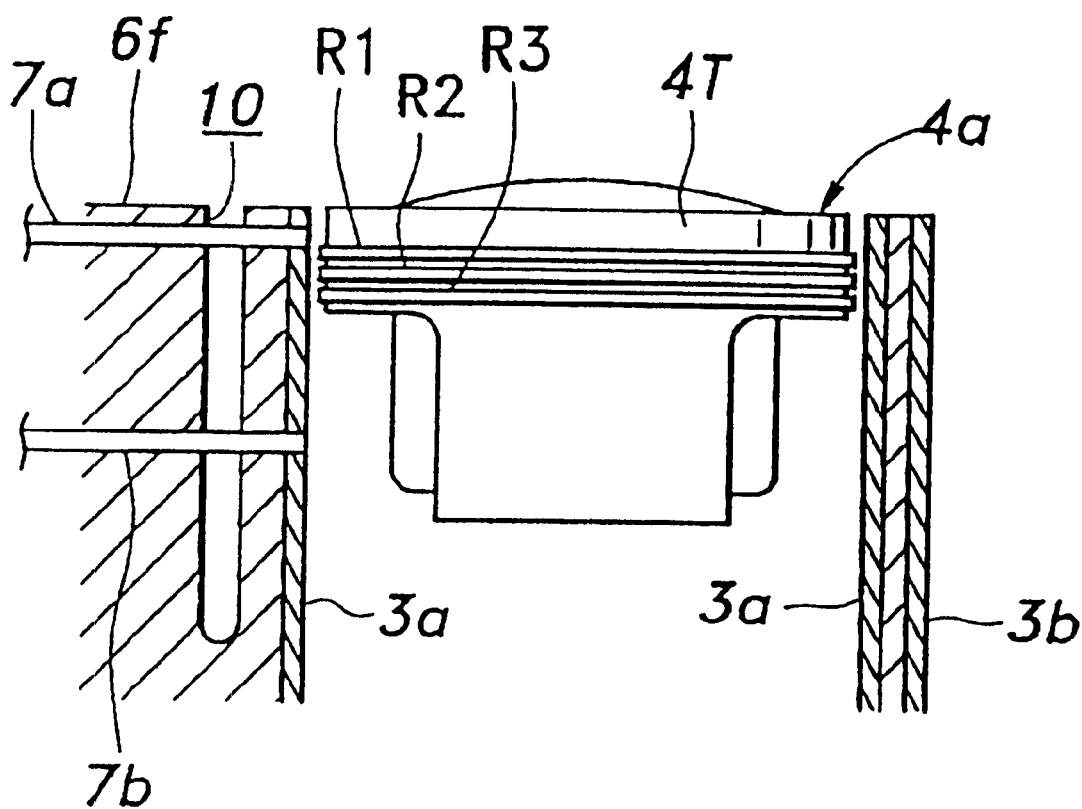
FIG. 5 is a sectional view of a main part of a number 1 cylinder showing a state in which sensors are disposed.

In addition, in the embodiment shown in the accompanying drawings, as shown also in FIG. 5, the pair of sensors 7a, 7b are vertically disposed in an end wall 6f of the cylinder block 6 opposite to the side where the out of the engine is taken toward the transmission. The sensors 7a, 7b so disposed allow the detection of the behavior of the top land of the piston 4c which is farthest away from the thrust control portion 17 in the axial direction of the crankshaft 5 and moreover they can detect such a behavior with high accuracy.

In addition, a timing belt and the like are provided on the end wall 6f side of the cylinder block 6, and a water pump 18 is also provided on the same side of the cylinder block 6. Thus, since the above sensors 7a, 7b are disposed in the vicinity of such a large cooling source, the cooling effect on the sensors 7a, 7b can preferably be improved. Cooling water whose heat is dissipated at a radiator (not shown) is introduced into the water pump 18, and formed in the end wall 6f of the cylinder block 6 is a cooling water introduction port 6w for introducing the cooling water discharged from the water pump 18 into the cylinder block 6.

The detection procedure of the behaviors of the pistons using the sensors 7a, 7b, 8a, 8b constructed as described above will be described below with reference to a block diagram shown in FIG. 6. in FIG. 6, the description is made with reference to the sensor 8a which is representative of the other sensors.

Figure 6:
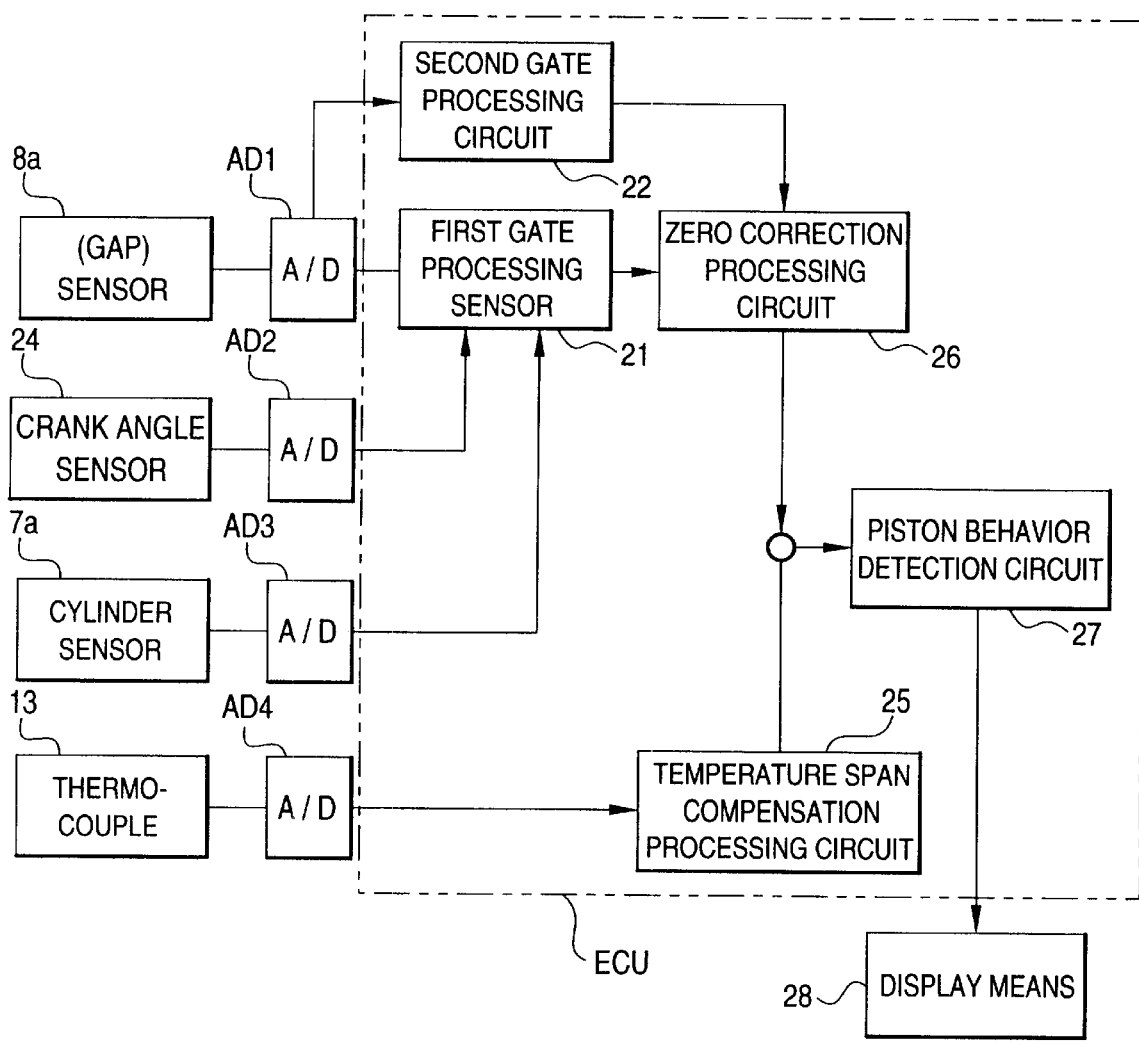
FIG. 6 is a block diagram showing a control based on the present invention.

As shown in FIG. 6, an output value from the sensor 8a is converted into a digital signal from an analog one at an AD converter AD1, and the converted signal is then inputted into a first gate processing circuit 21 and a second gate processing circuit 22, respectively. An output value from a crank angle sensor 24 for detecting the crank angle using a crank pulley 23 mounted on the crankshaft 5 as shown in FIG. 1 and an output value from a cylinder sensor, not shown, provided on a cam side of a cylinder head are inputted into the first gate processing circuit 21 via an AD converter AD2 and an AD converter AD3, respectively. Furthermore, an output signal from the aforesaid thermocouple 13 is inputted into a temperature span compensation processing circuit 25 within an main control unit ECU via an AD converter AD4. The respective strokes and top dead centers of the respective cylinders are detected by means of the cylinder sensor and the crank angle sensor 24.

In the main control unit ECU, an output signal from the first gate processing circuit 21 is inputted into a zero correction circuit 26, and an output signal from the second gate processing circuit 22 is also inputted into the same zero correction circuit 26. An output signal from this zero correction circuit 26 and an output signal from the temperature span compensation processing circuit 25 are added to each other and what is added is then inputted into a piston behavior detecting circuit 27. Then, a piston behavior signal from the piston behavior detecting circuit 27 is outputted into a display means 28 such as a CRT located outside the main control unit ECU, and the behavior of the piston can be visualized via the display means 28.

Figure 7:
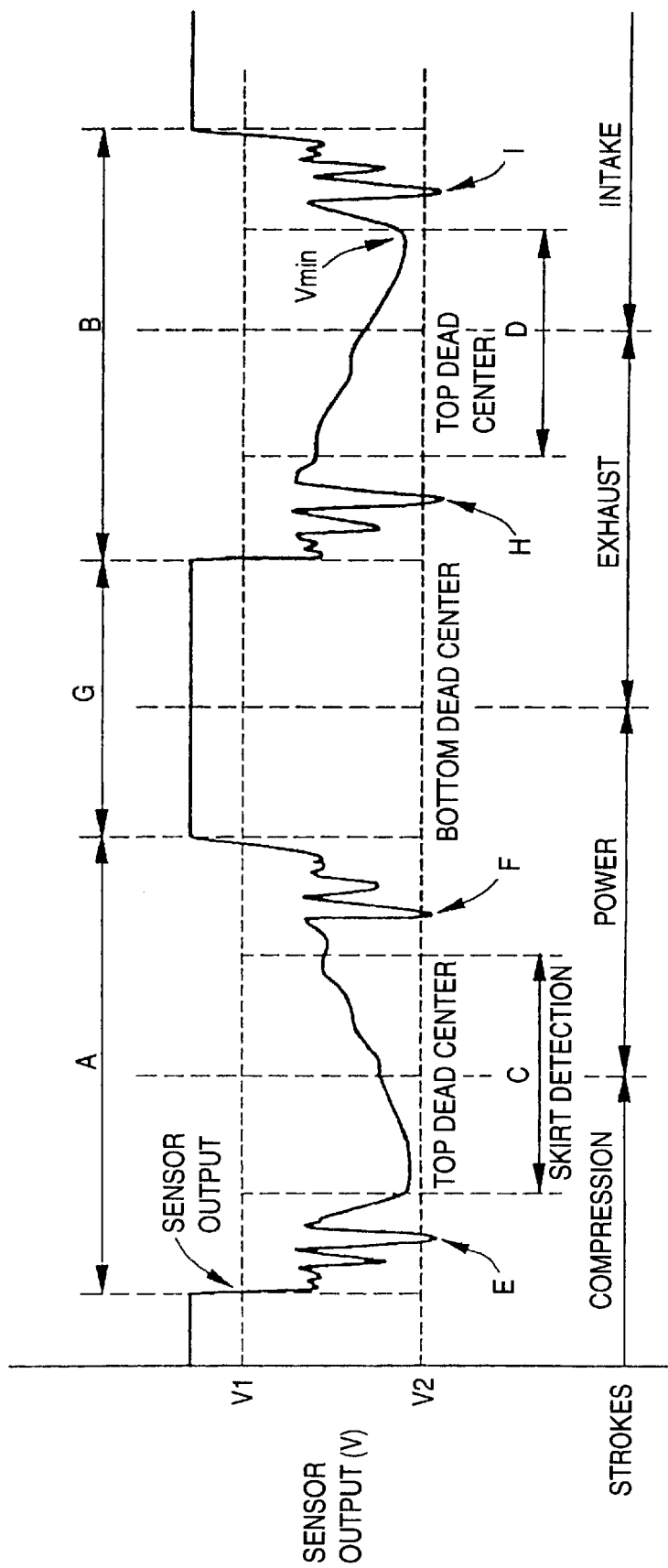
FIG. 7 is a wave form diagram showing the sensor showing the control according to the invention.

Next, the control procedure of the invention will be described with reference to a waveform in FIG. 7 which shows a change, detected by the sensor 8a, in gap between the piston 4c and the associated cylinder liner 3c thereof. In FIG. 7, the gap amount is shown along the axis of ordinate and time (the crank angle) is shown along the axis of abscissa. This example shown in FIG. 7 describes a case of a 4-cycle engine.

The sensor 8a utilizes an eddy current gap sensor as described above, and as shown in FIG. 8, a characteristic is shown in which the output voltage varies depending upon the distance from the sensor to a measuring target (the piston 4c)

As shown in FIG. 7, the sensor output V as a detected gap value reaches an upper limit as far as an intermediate position along the compression stroke, and as the piston 4c approaches the sensor 8a, being affected by the approach, the sensor output V starts to reduce. In this example shown in FIG. 7, a trigger voltage V1 is set slightly lower than the upper limit value, and when the sensor output V lowers below the trigger voltage V1, it is recognized that the piston 4c can be detected by the sensor 8c.

As shown in FIG. 7, since the piston 4c passing an intermediate portion of the power stroke following the compression stroke goes away from the sensor 8c, the sensor output V again comes into a state in which it reaches the upper limit value. Then, in the following exhaust and intake strokes, too, similarly to the above compression and power strokes, the sensor output V starts to reduce (detection of the piston 4c) from an intermediate position of the exhaust stroke, and next the sensor output V reaches the upper limit value from an intermediate position of the intake stroke. Therefore, in FIG. 7, portions A, B are those where the piston 4c can be detected by means of the sensor 8a.

In addition, the sensor 8a adopts aluminum, and easily changing portions appearing in portions C, D before and after the top dead centers appearing in turn in the portions A, B, respectively, show waveforms detecting the piston skirt of the aluminum made piston 4c. In contrast to this, teeth-like portions appearing in portions other than the portions C, D show waveforms detecting the passage of the three steel piston rings.

As is described above, the sensor 8a, as shown in FIG. 8, has a characteristic in which the sensor output V varies in a liner fashion, but as indicated by a solid line indicating a case in which the ambient temperature is 20 degrees Celsius and a dotted line indicating a case in which the ambient temperature is 100 degrees Celsius, it is general that the sensor output V drifts when the temperature changes. Therefore, a position set to zero when the sensor 8a is mounted deviates as the ambient temperature increases while the engine is running, and with a predetermined engine speed or a predetermined engine load, a drift amount can be corrected to some extent, but in a case where the drift amount varies moment by moment, it is not possible to cope therewith.

In the invention, a minimum output value (a value that has approached closest the sensor 8a) within the portion C (D) is stored as a minimum value Vmin in operation which corresponds to a zero output indicating that the piston 4c comes into contact with the inner circumferential surface of the cylinder liner 3c, and a variation AV is obtained between a reference value which is a zero output in a pre-stored reference temperature (for example, 20 degrees Celsius) and the minimum value Vmin in operation and a zero correction is then performed in which the variation ΔV is corrected (added or subtracted) relative to the detected value V.

Here, in determination of the portion C (D), a determination is carried out by gate processing the sensor output V in the second gate processing circuit 22. Since there appear in the sensor V waveforms indicating the detection of the three piston rings in the portions before and after where the piston skirt is detected, among them only the top ring detection value E, F (H, I) showing the greatest effect (the sensor value V becomes minimum) as the piston ring passing position is constructed so as to be detected by a trigger voltage V2 for detecting the crank angle. The top ring output value E, F (H, I) appears twice within the portion C (D), and this is because the top ring passes the sensor 8a as the piston rises and lowers before and after the top dead end center thereof.

Consequently, an intermediate point between the two top ring output values E, F (H, I) constitutes a top dead center for the piston, and this results in the portion C (D) existing between the top ring output values E, F (H, I), and therefore, when the portion A (B) is detected, a value at which the sensor output value V becomes minimum between the two top ring output values E, F (H, I) may be made to be the minimum value Vmin in operation. The determination of strokes (compression, power, exhaust and intake strokes) within the respective portions E, F, H, I may be effected by recognizing a state in which a portion G in which the sensor output values reach their upper limit values between the portions A, B.

Thus, the minimum value Vmin in operation detected and processed in the second gate processing circuit 22 is outputted to the zero correction processing circuit 26. Inputted into this zero correction processing circuit 26 is the sensor output (the detected value) within the above portion A (B) which is processed in the first gate processing circuit 21. Then, as described above, the zero correction is carried out in which the variation ΔV is added to the sensor output value V.

When this is done, a plurality of minimum values Vmin in operation are detected over a plurality of cycles in order to improve the accuracy of the variation ΔV, and those minimum values Vmin in operation so detected may be, for example, averaged.

Even if the detected values V are caused by virtue of the effect of heat to drift relative to the characteristic at the reference temperature, the above construction can allow the detected values which drift to be corrected by an amount equal to the drifts, thereby making it possible to obtain gap values which are substantially equal to actual gaps. Since the minimum value Vmin in operation becomes a negative value, as shown in FIG. 7, when described in the circuit, an arithmetic operation is carried out in which the minimum value Vmin in operation is subtracted from the detected value V.

Figure 8:
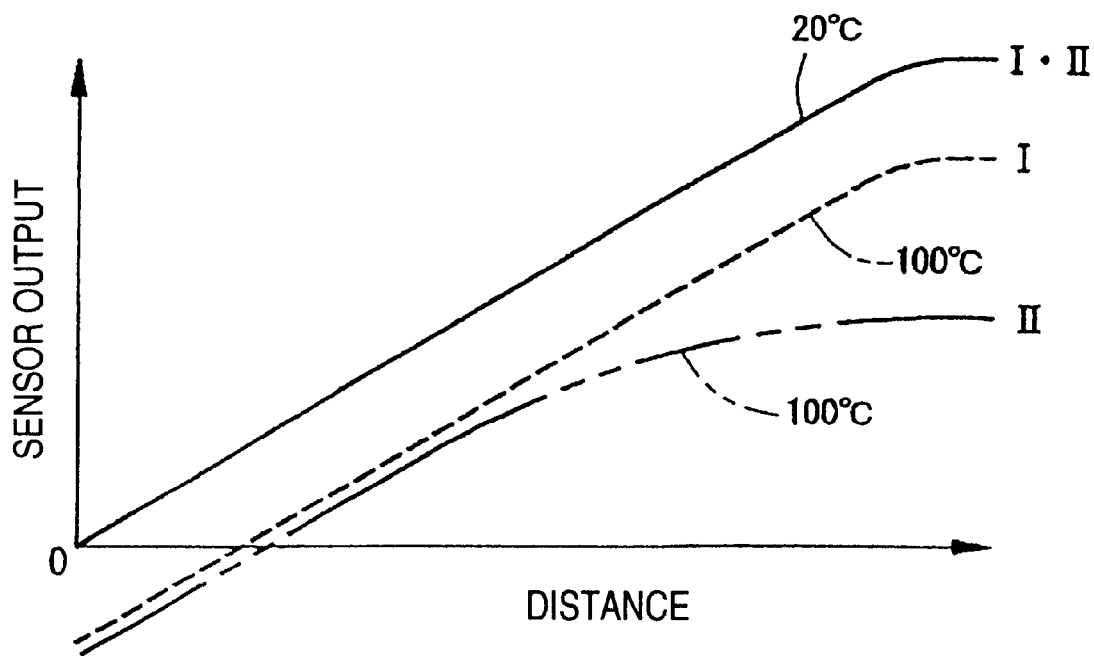
FIG. 8 is a graph showing the temperature properties of the sensor.

In the temperature span compensation processing circuit 25, the temperature span compensation is processed in response the temperature characteristic stored in advance in the sensor 8*a* based on the detected temperature value from the thermocouple 13. For example, as shown in FIG. 8, the temperature compensation is carried out for every sensor in response to the characteristics I, II thereof at 100 degrees Celsius.

In addition, the behavior of the piston 4*c* when it rises or lowers within the cylinder can be analyzed by observing the change in amount of gap of the piston 4*c* relative to the crank angle. To this end, the crank angle and the gap amount are detected, but, there is caused a phase deviation in particular when the engine speed is fast due to the difference in response frequency between the gap sensor 8*a* and the crank angle sensor 24 only by detecting the crank angle with the crank sensor 24, as shown with respect to the prior art example. In this case, if a form of display is adopted in which the piston behavior is not displayed for every crank angle, there is caused aproblem that an accurate crank angle cannot be obtained.

In contrast to this, a crank angle between detection timings of the top ring output values E, F (H, I) by storing (setting) in advance the crank angle between the two output values. In addition, as described above, since the intermediate point between the two top ring output values E, F (H, I) becomes the position of the top dead center, when the respective two top ring output values E, F (H, I) are detected based on the crank angle detecting trigger voltage V2, it is possible to calculate an intermediate point between the detecting timings of those two values. Then, the phase deviation of the crank angle signal of the crank angle sensor 24 can be corrected by comparing the top dead center position obtained from the output waveform of the gap sensor 8*a* and the top dead center position signal by the crank angle sensor 24.

Thus, the signal which has been processed in terms of the zero correction, crank angle phase deviation correction and temperature span compensation is then inputted into the piston behavior detecting circuit 27, where for example, the piston position for every predetermined crank angle (the gap between the cylinder liner and the piston) is graph processed so as to be visualized on a display means 28. The piston behavior graph displayed in this way becomes accurate with erroneous detections due to thermal distortion and effect of the difference in response frequency of the sensors being eliminated.

As shown remarkably in the waveforms, in particular, in the portions C, D, the pistons exhibit opposite behaviors from the mutual relationship between the combustion load relative to the piston and the inertia load in the portions A, B.

According to the first aspect of the invention, the accommodating cases for the sensors can be provided in such a manner as to extend through the water jacket so as to be cooled in a preferable fashion, and the sensors can be in turn cooled via the accommodating cases, respectively, whereby the effect of heat from the combustion chambers can be reduced. Due to this, the detection accuracy of the sensors can be improved, and moreover, in a case where the sensor accommodating cases are so provided, even if the cylinder block deforms by virtue of the effect of heat from the combustion chambers, the sealing can be maintained with the sensor accommodating chambers being prevented from being affected by the same heat, whereby the cooling effect of the cooling water can be enjoyed without causing any problem.

In addition, even if lids are provided for protection of the sensors, the pistons are prevented from being damaged by protecting the sensors against heat from the combustion chambers with the heat resistant resin lids, and the bores of the cylinders can easily be machined even after the lids are installed, whereby not only can the sealing properties be secured, but also the magnetic properties of the sensors cannot be affected since the lids are made of resin, the detection accuracy of the sensors being thus improved.

Moreover, since the top land of the piston which is liable to be thermally deformed largely is constructed to be detected with respect to a displacement which is relatively large in the axial direction of the crankshaft, which is a direction in which the cylinders are arranged, the accuracy with which the piston behaviors are detected can be improved. In particular, not only can the piston behaviors be detected in a preferable and accurate fashion but also the sensor mounting structure can be prevented from getting complicated, whereby the cylinder block is prevented from getting large in size by providing in the end wall of the cylinder block the sensors for detecting the position of the top land of the piston which is liable to vary largely and is located at the position far away from the thrust control portion for the crankshaft. In addition, the sensors may only have to be disposed on the side avoiding the direction normal to the axis of the crankshaft, in other words, at the angle of substantially 180 degrees or less than 180 degrees, and with this disposition of the sensors the behavior of the piston in the axial direction of the crankshaft can be detected.

In addition, in the multi-cylinder engine, since the sensors can be disposed at the position which is highest in cooling efficiency by disposing them in such a manner as to face the interior of the cylinder liner which is closest to the cooling water introducing port for introducing cooling water from the water pump, the effect on the sensors of heat from the combustion chambers can be reduced as low as possible, thereby making it possible to improve the detection accuracy.

Moreover, according to the second aspect of the invention, even in a case where there is caused a deviation in sensor position by virtue of the difference in thermal expansion caused by the difference in material between the cylinder liner and the gap sensors, since the gap minimum value detected when the engine is in operation can be zero corrected as the zero position where the piston comes into contact with the cylinder liner, the generation of an error in a value detected when the engine is in operation can be prevented. In particular, the minimum values in operation for a zero correction can be calculated with high accuracy by taking out a plurality of minimum values which are a reference for performing the above zero correction and for example, calculating them for an average value.

In addition, the top dead center position of the piston can be detected with accuracy by directly observing the piston position by the sensors for detecting a gap between the piston and the associated cylinder liner, and even if there is caused a difference in frequency response between a crank angle detected by the crank angle sensor which is provided separately and the top dead center position so detected when the engine speed is fast, a needed correction can be performed.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A piston behavior analyzing sensor mounting structure for mounting sensors on a cylinder block, comprising:
    sensors for detecting gaps between pistons and associated cylinder liners on at least top dead center sides of said pistons for analysis of behaviors of said pistons while an engine is running; and
    accommodating cases, for accommodating said sensors, which pass through a water jacket surrounding said cylinder liners.

2. The piston behavior analyzing sensor mounting structure as set forth in claim 1, wherein said accommodating cases are fixed on a cylinder liner side, and portions of said accommodating cases located more outwardly of said water jacket are sealed with a sealing member so as to allow a thermal deformation of said accommodating cases relative to said cylinder block.

3. The piston behavior analyzing sensor mounting structure as set forth in claim 1, wherein portions of said sensors facing the interiors of said cylinder liners are covered with lids of a heat resistant resin.

4. The piston behavior analyzing sensor mounting structure as set forth in claim 1, wherein said sensors are disposed so as to extend from a side of said cylinder block which is not in a direction normal to the axis of a crankshaft toward the interior of said cylinder liner and in an end face of said cylinder block which is farthest away in an axial direction of said crankshaft from a portion where a thrust control portion for said crankshaft is provided.

5. The piston behavior analyzing sensor mounting structure as set forth in claim 1, wherein first sensors are disposed so as to extend from a side of said cylinder block in an axial direction of a crankshaft toward the interior of said cylinder liner, and second sensors are disposed so as to extend from a side of said cylinder block which is normal to the axis of said crankshaft toward the interior of said cylinder liner.

6. The piston behavior analyzing sensor mounting structure as set forth in claim 1, wherein an introduction port is formed in said cylinder block for introducing cooling water discharged from a water pump, and said sensors are disposed so as to extend toward the interior of a cylinder liner which is closest to said cooling water introduction port.

7. A piston behavior analyzing sensor mounting structure for mounting sensors on a cylinder block, comprising:
    sensors for detecting gaps between pistons and associated cylinder liners on at least top dead center sides of said pistons for analysis of behaviors of said pistons while an engine is running; and
    heat resistant resin lids covering portions of said sensors that face interiors of said cylinder liners.

8. A piston behavior analyzing sensor mounting structure for mounting sensors on a cylinder block, comprising:
    a cylinder block;
    sensors for detecting gaps between pistons and associated cylinder liners on at least top dead center sides of said pistons for analysis of the behaviors of said pistons while an engine is running,
    wherein said sensors are disposed so as to extend from a side of said cylinder block in an axial direction of a crankshaft toward the interior of said cylinder liner.

9. The piston behavior analyzing sensor mounting structure as set forth in claim 8, further comprising accommodating cases for accommodating said sensors, which pass through a water jacket surrounding said cylinder liners.

10. The piston behavior analyzing sensor mounting structure as set forth in claim 9, wherein said accommodating cases are fixed on a cylinder liner side, and portions of said accommodating cases located more outwardly of said water jacket are sealed with a sealing member so as to allow a thermal deformation of said accommodating cases relative to said cylinder block.

11. The piston behavior analyzing sensor mounting structure as set forth in claim 8, wherein portions of said sensors facing the interiors of said cylinder liners are covered with lids of a heat resistant resin.

12. The piston behavior analyzing sensor mounting structure as set forth in claim 8, wherein said sensors are disposed so as to extend from a side of said cylinder block which is not in a direction normal to the axis of a crankshaft toward the interior of said cylinder liner and in an end face of said cylinder block which is farthest away in an axial direction of said crankshaft from a portion where a thrust control portion for said crankshaft is provided.

13. The piston behavior analyzing sensor mounting structure as set forth in claim 8, wherein first sensors are disposed so as to extend from a side of said cylinder block in an axial direction of a crankshaft toward the interior of said cylinder liner, and second sensors are disposed so as to extend from a side of said cylinder block which is normal to the axis of said crankshaft toward the interior of said cylinder liner.

14. The piston behavior analyzing sensor mounting structure as set forth in claim 8, wherein an introduction port is formed in said cylinder block for introducing cooling water discharged from a water pump, and said sensors are disposed so as to extend toward the interior of a cylinder liner which is closest to said cooling water introduction port.

15. A piston behavior analyzing sensor mounting structure for mounting sensors on a cylinder block, comprising:
    a cylinder block; and
    sensors for detecting gaps between pistons and associated cylinder liners on at least top dead center sides of said pistons for analysis of behaviors of said pistons while an engine is running,
    wherein said sensors are disposed so as to extend from a side of said cylinder block, which is not in a direction normal to the axis of a crankshaft, toward an interior of said cylinder liner and in an end face of said cylinder block, which is farthest away in an axial direction of said crankshaft, from a portion where a thrust control portion for said crankshaft is provided.

16. A piston behavior analyzing sensor mounting structure for mounting sensors on a cylinder block, comprising:

a cylinder block; and first sensors and second sensors for detecting gaps between pistons and associated cylinder liners on at least top dead center sides of said pistons for analysis of behaviors of said pistons while an engine is running, wherein said first sensors are disposed so as to extend from a side of said cylinder block in an axial direction of a crankshaft toward an interior of said cylinder liner, and said second sensors are disposed so as to extend from a side of said cylinder block which is normal to the axis of said crankshaft toward the interior of said cylinder liner.

17. A piston behavior analyzing sensor mounting structure, comprising:

sensors mounted on a cylinder block for detecting gaps between a piston and an associated cylinder liner on at least a top dead center side of said piston for analysis of the behavior of said piston while a multi-cylinder engine is running, wherein an introduction port is formed in said cylinder block for introducing cooling water discharged from a water pump, and said sensors are disposed so as to extend toward an interior of a cylinder liner which is closest to said cooling water introduction port.

18. A piston behavior analyzing method for analyzing the behavior of a piston through change in a gap between said piston and an associated cylinder liner in response to an angle of an associated crank while an engine is running, comprising the steps of:

detecting a gap between said piston and said associated cylinder liner with sensors provided in said cylinder liner;

obtaining a variation between a reference value, corresponding to an abutment state between said piston and said cylinder liner, and a minimum value in operation constituted by a minimum value among gap values detected while the engine is running; and correcting said gap values detected while the engine is running by an amount equal to said variation for an actual gap value.

19. A piston behavior analyzing method as set forth in claim 18, wherein said minimum value among said gap values detected while the engine is running is taken over a plurality of numbers of cycles, and wherein said minimum value in operation is calculated based on a plurality of said minimum values taken.

20. A piston behavior analyzing method for analyzing the behavior of a piston using a sensor to detect a change in a gap between said piston and an associated cylinder liner in response to the angle of an associated crank while an engine is running, comprising the steps of:

detecting positions before and after a top dead center of said piston where piston rings of said piston pass with said sensor provided in said cylinder liner for detection of said gap, and making an intermediate point between two points of said positions where said piston rings pass a top dead center when analyzing the behavior of said piston.

21. A piston behavior analyzing sensor mounting structure, comprising:

a cylinder block;

a sensor mounted on the cylinder block for detecting gaps between a piston and an associated cylinder liner on at least a top dead center side of said piston for analysis of a behavior of said piston while an engine is running; and an accommodating case for accommodating said sensor, wherein said accommodating case passes through a water jacket surrounding said cylinder liner.

22. A piston behavior analyzing sensor mounting structure, comprising:

a cylinder block;

a sensor mounted on said cylinder block for detecting a gap between a piston and an associated cylinder liner on at least a top dead center side of said piston for analysis of a behavior of said piston while an engine is running; and a heat resistant resin lid covering a portion of said sensor facing the interior of said cylinder liner.

* * * * *